United States Patent [19]

Künkele et al.

[11] 4,115,133

[45] Sep. 19, 1978

[54] UNBURNT REFRACTORY MASSES OR BRICKS FOR METALLURGICAL VESSELS BASED ON CHROME-ORE AND CARBON-CONTAINING BINDER

[75] Inventors: Rudolf Künkele, Mulheim; Hans-Peter Engelhardt, Krefeld, both of Germany

[73] Assignee: Magnesital-Feuerfest GmbH, Germany

[21] Appl. No.: 827,407

[22] Filed: Aug. 24, 1977

[30] Foreign Application Priority Data

Aug. 26, 1976 [DE] Fed. Rep. of Germany ....... 2638458

[51] Int. Cl.² .................... C04B 35/52; C04B 35/12; C04B 35/42
[52] U.S. Cl. ......................................... 106/56; 106/59; 106/66; 266/275; 266/280; 266/284
[58] Field of Search .................... 106/56, 66, 59; 266/284, 280

[56] References Cited

U.S. PATENT DOCUMENTS

| | | | |
|---|---|---|---|
| 3,236,664 | 2/1966 | Wilson et al. | 106/56 |
| 3,256,104 | 6/1966 | Weaver | 106/59 X |
| 3,312,457 | 4/1967 | Schweinsberg et al. | 266/284 X |
| 3,351,476 | 11/1967 | Weaver et al. | 106/59 X |
| 3,354,940 | 11/1967 | Walther et al. | 106/59 X |
| 3,416,779 | 12/1968 | Campbell | 266/280 X |
| 3,421,749 | 1/1969 | Garber et al. | 106/59 X |
| 3,775,140 | 11/1973 | Visser et al. | 106/56 |
| 4,049,461 | 9/1977 | Mort et al. | 106/56 |

FOREIGN PATENT DOCUMENTS

| | | | |
|---|---|---|---|
| 1,508,180 | 7/1971 | Fed. Rep. of Germany | 266/284 |
| 1,112,735 | 5/1968 | United Kingdom | 106/59 |

*Primary Examiner*—Helen M. McCarthy
*Attorney, Agent, or Firm*—Burgess, Dinklage & Sprung

[57] ABSTRACT

An unburnt refractory mass, which can be in the form of a brick, for use in vessels employed in metallurgical refining consisting essentially of chromium-ore, sintered magnesia and a carbon-containing binder, said mass consisting essentially of:

75 to 95% by weight chromium ore having a $Cr_2O_3$ content of at least 30% by weight;

0 to 19% sintered magnesia poor in iron content; and 2 to 7% hard pitch combined with 1.5 to 5% carbon so as to provide an overall residual carbon of 3 to 6%.

8 Claims, No Drawings

UNBURNT REFRACTORY MASSES OR BRICKS FOR METALLURGICAL VESSELS BASED ON CHROME-ORE AND CARBON-CONTAINING BINDER

BACKGROUND OF THE INVENTION

1. Field of the Invention

This invention relates to an unburnt refractory mass in the form of granules, bricks or the like for use in vessels employed for metallurgical refining. More especially, this invention relates to an unburnt refractory mass consisting essentially of chromium ore and a carbon-containing binder and optionally including a proportion of sintered magnesia.

2. Discussion of the Prior Art

Refractory masses or bricks have long been known for use in metallurgical vessels. It has also been known to employ refractory masses or bricks in the burnt state made from chromium ore. It is known that such refractory masses or bricks have a desirable resistance to basic and acid slags. Unfortunately such burnt refractory masses or bricks have unsatisfactory physical properties with respect to changes in temperature and stability. It is also known that metallurgical vessels formed from burnt chromium-containing refractory masses are subject to bursting. A survey of typical bricks formed from chromium-containing masses is given in LUEGER "Lexikon der Huttentechnik" (1973), page 115.

Unburnt refractory masses or bricks containing chromium ore components have also been described in German Pat. No. 667 691, German Auslegeschrift No. 1 014 913 and German Auslegeschrift No. 1 646 837. German Pat. No. 667 691 describes a chromium ore-containing refractory mass containing less than 3% silica and containing inorganic binding materials such as colloidal silica or volatilizable materials such as tar or drying oils. Sulfite liquor is also described therein as a suitable binder.

German Auslegeschrift No. 1 014 913 describes a non-acid refractory mass or brick, particularly an unburnt refractory brick derived from a mixture of chromium ore and burnt magnesia. Sulfuric acid, acidic sodium sulfate, magnesium sulfate, magnesium chloride, sulfur liquor or other organic binders are described as useful binders therefore. As the slag resistance, stability, cold crushing strength and resistance to changes in temperature of known refractory masses containing chromium ore components is unsatisfactory it is proposed in German Auslegeschrift No. 1 646 837 to burn a mixture of chromium ore and magnesite to produce a simultaneous sinter as an initial product and to bring up this simultaneous sinter for the production of unburnt bricks. In this previously known process it was considered essential that the simultaneous sinter already have the properties of the burning at elevated temperature, i.e., the direct bond between the chromium oxide containing materials and the magnesia. To produce the bricks, the sintered material in granular form was mixed in a known manner with tar and/or pitch and then formed into bricks. These bricks should have produced an extended strength in relationship to other chromium based bricks in the open hearth furnace. Unfortunately the production of a simultaneous sinter requires a subsequently performed burning process.

It became desirable, therefore, to provide a refractory mass resistant to both acid and basic sludges having improved physical properties with respect to resistance upon being subjected to changes in temperature. It became especially desirable to provide such a refractory mass in granular or in brick form which was unburnt and did not require a superposed burning process. Still moreover, it became desirable to provide a suitable refractory mass for use in metallurgical refining vessels whereby the components of such refractory mass would not interfere with the metallurgical refining process or in the purity of the components derived therefrom. It has become desirable especially to provide a refractory mass or brick for use in the walls of ladles employed in ladle degassing, desulfurization, melt alloying and similar refining steps. Such has become desirable because of the refining practice whereby steel at higher temperatures is tapped into a ladle thereby subjecting the ladle to significant temperature change. It has been discovered that the previously employed lining material for such vessels based upon alumina, silica or both no longer satisfies the requirements. Hence, it has become desirable to provide a suitable replacement for the linings of ladles heretofore lined with basic products especially alumina or silica alumina containing over 60% by weight $Al_2O_3$.

SUMMARY OF THE INVENTION

In accordance with this invention is provided a refractory mass characterized by high resistance to acid and basic slags, high resistance to changes in temperatures and high stability. Existing DIN- and AStM-Testing methods are not satisfactory to define thermal shock resistance and hot strength in practical use. Resistance against slag however is excellent according to DIN 51 069, part 2 and AStM C 768-73. The mass consists essentially of:

75 to 95% by weight of chrome ore with a $Cr_2O_3$ proportion of at least 30%, 0 to 19% of sintered magnesia which is poor in iron; and 2 to 7% by weight hard pitch combined with 1.5 to 5% carbon to produce a residual carbon content of 3 to 6%.

Preferably the refractory mass contains 75 to 85% by weight of chrome ore having a $Cr_2O_3$ content of at least 33%. Desirably, the refractory mass contains sintered magnesia which is poor in iron content which magnesia is present in an amount of up to 19% especially 10 to 19% by weight. Preferably, when sintered magnesia is included in the refractory mass the $Fe_2O_3$ of the sintered magnesia content is less than 1.8%, although preparations of sintered magnesia having $Fe_2O_3$ content between 0.2 and 8% are known.

The hard pitch content preferably amounts to 3–5% and the carbon content to 2–4 weight percent. The carbon content is supplied by using materials such as coke, graphite and/or soot. It has been established that this carbon content when combined with hard pitch guarantees the required high residual carbon. The residual carbon content of about 4.5% providing optimum results with respect to slag resistance without impairing the other physical properties.

With respect to the residual carbon it is to be understood that the term applies to that amount of carbon remaining in the composition after the same is baked according to AStM C 831-76 but prior to any burning operation at the much higher sintering temperatures. The composition of the present invention is an unburned refractory mass.

When sintered magnesia is included in the refractory mass it is preferably in an amount of 10–15%, its $Fe_2O_3$ content amounting to less than 1%. Sintered magnesia with an $Fe_2O_3$ content of less than 0.5% is particularly preferred. By choosing such an appropriate sintered magnesia of low iron content it is guaranteed that the provided carbon proportions and high pitch proportions lead to the required high residual carbon content.

The chromium-containing ore should have an $Fe_2O_3$ content of less than 25% especially an $Fe_2O_3$ content of 13 to 16%. Refractory chrome material is suitable.

Unburnt refractory bricks containing 0.5 to 2.5% sulfite liquor as binder and/or 0.5 to 2.5% impregnating oil for impregnation are contemplated herein. Impregnating oils useful are those known to the specialist and include materials such as wood protective agents employed for railway sleepers, telephone poles, and wood employed in hydraulic systems and the like. Such impregnants are commercial coaltar oils and composed of filtered anthracene oil and low-boiling tar oils such as naphthalene oil. The components are derived from the distillation of coaltar.

When the refractory composition of the present invention contains an impregnating oil the same preferably has density of 1.0 to 1.20 $g/cm^3$ (at standard temperature and pressure). The impregnating oils of relatively high viscosity promote the wetting of the grains of the refractory mass. The components of the refractory mass are mixed in cold condition, e.g., on a compulsory mixer, and when employed in the form of bricks they are mixed and mechanically or hydraulically formed into shape employing specific pressing forces of from 400 to 1000 $kg/cm^2$, preferably 800 $kg/cm^2$ as a maximum. Thereafter they are dried in oxidizing environment at temperatures of 105°–115° C and subsequently tempered. Tempering is usually carried out at a temperature of about 300° C, generally 250° to 350° C.

The refractory composition, whether in the form of a granular mass, brick or the like, is suitable for use in steel ladles which will come in contact with steel at relatively high temperatures. Ladles containing walls of refractory masses or bricks of the present invention are resistant to severe temperature shocks and the action of aggressive acidic and/or basic slags. This is due to the effect that the residual carbon content provides. Simultaneously with great slag resistance the walls of the ladle have excellent temperature shock resistivity distributing heat better than refractory linings heretofore employed, especially those having high alumina content. It has been shown that the refractory lining of the invention resists acids, bases and amphoteric slag action. This is important in certain metallurgical operations which are carried out one after the other in a ladle with changing slag composition.

In order to more fully illustrate the invention and the manner of practicing the same the following examples are presented.

EXAMPLES

EXAMPLE 1

80% chrome ore (chrome-spinel content 90%, granulation 0–6 mm) is mixed with 12% finely ground sintered magnesia which is poor in iron ($Fe_2O_3$ content 0.3%, lime-silica ratio 2 to 3:1, silica content 0.5%), 4% hard pitch (sagging point at above 160° C, residue after distillation at 360° C of over 85%, carbon content according to Conradson from above 60%) and 3% finely ground carbon in the form of graphite, anthracite, coke etc., amorphous carbon in the form of soot. As a proportion of impregnating oil of 0.8 to 1.5% is preferred for brick production 1% impregnating oil (density 1.1 $g/cm^3$, water content 1% at maximum, distillation at 210° C 1% at maximum, at 235° C 10% at maximum, at 335° C 80% at maximum) is added. The sulfite liquor proportion also amounts to 1%.

The mass is formed into bricks with a mechanical press at a pressure of 650 $g/cm^2$ and dried in an oxidizing environment at 110° C, the core humidity being below 0.1%. The blanks are then tempered at 300° C. The chemical composition of the bricks is as follows:

30% $Cr_2O_3$; 29.5% MgO; 18% $Al_2O_3$; 12% $Fe_2O_3$; 5% $SiO_2$; 4.5% residual carbon content; 1% CaO. The ignition loss amounts to 6%. The grain structure of the bricks is composed as follows:

0 to 0.1 mm 15%
0.1 to 0.4 mm 10%
0.4 to 1 mm 8%
1 to 3 mm 40%
3 to 6 mm 15%

After the tempering the brick has a cold crushing strength of 250 $kg/cm^2$; an apparent porosity of about 10% and a bulk density of approximately 310 $kg/m^3$.

In the case of slag action the brick combines a sufficient cold crushing strength with high slag resistance and resistance to changes in temperature for use in a steel ladle.

EXAMPLE 2

Analogous to the method of operation described above, an unburnt brick was produced without proportions of sintered magnesia which is poor in iron. The proportion of chrome ore was increased as follows:

90% chrome ore (chrome-spinel content 90%, granulation 0–6 mm) 6% hard pitch combined with 4% carbon.

The mixture was compounded with the amounts of binder mentioned in Example 1 and formed analogous to the refractory bricks which were subsequently tempered.

The tempered brick had a residual carbon content of 4.7%.

The brick without proportion of sintered magnesia which is poor in iron is marked by its resistance in respect of extremely acid slags (slag ratio $\leq$ 0.9) and by high resistance to changes in temperature. The same combination of properties is found in masses according to the invention if they contain no or only a small amount of sintered magnesia which is poor in iron.

Both examples relate to unburnt bricks. The masses can also be analogously rammed into the vessels in untempered state by means of compressed air rammer.

What we claim is:

1. An unburnt refractory mass consisting essentially of:
   75 to 85% by weight of chrome ore having a $Cr_2O_3$ content of at least 33 weight percent;
   10 to 19% by weight of sintered magnesia poor in iron content;
   2 to 7 weight percent hard pitch combined with 1.5 to 5 weight percent carbon to provide a residual carbon of 3 to 6%.

2. An unburnt refractory mass according to claim 1 containing sintered magnesia in an amount of 10 to 15%, the $Fe_2O_3$ content thereof being below 1%.

3. An unburnt refractory mass according to claim 1 containing 3-5 weight percent hard pitch content combined with 2-4 weight percent carbon.

4. An unburnt refractory mass according to claim 1 in the form of a brick said brick containing 0.5 to 2.5 weight percent sulfite liquor and 0.5 to 2.5 weight percent of an impregnating oil.

5. A steel ladle having a wall composed of the refractory mass of claim 1.

6. A ladle according to claim 5 wherein said mass is in the form of a brick.

7. An unburnt refractory mass according to claim 1 in the form of a brick.

8. An unburnt refractory mass according to claim 2 in the form of a brick.

* * * * *